C. RENSHAW.
CONTROL SYSTEM.
APPLICATION FILED JUNE 9, 1914.
1,189,290.
Patented July 4, 1916.
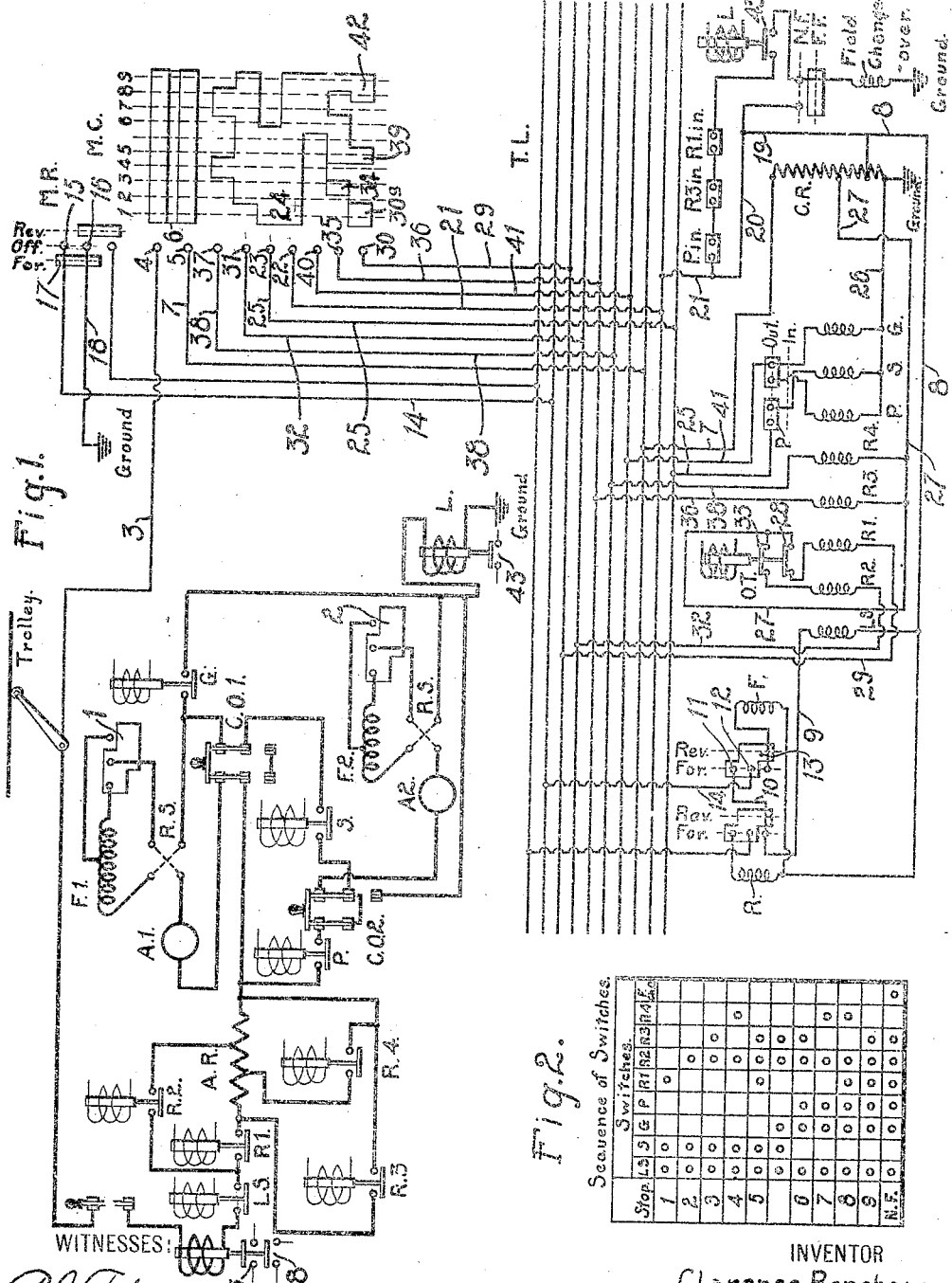
INVENTOR
Clarence Renshaw.
BY
Wesley B. Carr
ATTORNEY
WITNESSES:
R. J. Fitzgerald
W. R. Coley

UNITED STATES PATENT OFFICE.

CLARENCE RENSHAW, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,189,290.  Specification of Letters Patent.  Patented July 4, 1916.

Application filed June 9, 1914. Serial No. 843,939.

*To all whom it may concern:*

Be it known that I, CLARENCE RENSHAW, a citizen of the United States, and a resident of Edgewood Park, in the county of Allegheny and State of Pennsylvania, have invented a new and useful Improvement in Control Systems, of which the following is a specification.

My invention relates to systems of control, and it has special reference to the control of electric motors that are adapted to propel electric railway vehicles or the like.

The object of my invention is to provide a control system of the above-indicated character which shall be more efficient in operation than those heretofore employed and which shall employ relatively simple and inexpensive means for attaining the desired result.

More specifically stated, the object of my invention is to provide a control system embodying the well-known field-control feature, whereby, after the motors are connected in full parallel relation, the amounts of the field windings in circuit are not changed until the motor current has decreased to a predetermined value; and wherein the additional apparatus employed is very simple and inexpensive, and, in particular, requires only minor changes in the controller that is usually employed, in order to adapt it for field control.

In the prior art, control systems of the field control type have required the use of certain specially constructed, and, consequently, expensive apparatus. By employing my invention, however, the same apparatus ordinarily employed for non-field control systems, may be readily used with field-control motors when supplemented by simple additional devices that are adapted to delay the actuation of the field changeover switches until the motor current has decreased to a predetermined value, thereby preventing any abnormal rush of current and insuring a steady and smooth acceleration.

In the accompanying drawing, Figure 1 is a diagrammatic view of a system of control embodying my invention, the main circuits and the auxiliary control circuits being shown segregated, for purposes of simplicity and clearness, and Fig. 2 is a chart of well-known form showing the sequence of operation of the switches illustrated in Fig. 1.

Referring to the drawing, the system here shown comprises a pair of supply-circuit conductors respectively marked "Trolley" and "Ground"; a plurality of electric motors respectively having armatures $A^1$ and $A^2$ and subdivided series field windings $F^1$ and $F^2$; field changeover switches 1 and 2 for excluding predetermined portions of the field windings $F^1$ and $F^2$ from circuit, under predetermined conditions; a plurality of commonly mechanically actuated reversing switches RS of the usual type that are respectively electrically associated with the field windings $F^1$ and $F^2$; an accelerating resistor AR, the sections of which are adapted to be suitably manipulated by a plurality of switches $R^1$, $R^2$, $R^3$ and $R^4$ of a familiar type; a plurality of similar motor-operating switches LS, P, S, and G; a plurality of double-throw motor cutout switches $CO^1$ and $CO^2$, for respectively excluding the motors from circuit when thrown to one of their operative positions; an overload trip switch marked "O. T.", for the purpose of interrupting the control circuits under predetermined abnormal conditions; and a limit switch L, of a familiar type, that is associated with the field change-over switches 1 and 2, as hereinafter described.

The auxiliary control circuits shown comprise a master controller MC of familiar construction that is adapted to occupy a plurality of motor-operating positions 1 to 9, inclusive; a master reverser MR that is adapted to occupy a forward, an "off" and a reverse position; a plurality of magnet coils F and R for operating the reversing switches RS; a plurality of magnet coils for actuating the several circuit switches illustrated in Fig. 1, when energized through the master controller MC; a plurality of train line conductors TL for suitably connecting the master controller to the several magnet coils; a control resistor CR which is connected across the supply circuit and from portions of which the various magnet coils may be energized; a magnet coil marked "Field change-over", which, when energized, is adapted to simultaneously actuate the field change-over switches 1 and 2 from the usual "full field" position to the "normal field" position, in a well-known manner; and a plurality of interlocking contact members that are respectively designated with regard to the particular switch by which each member is adapted to be actuated.

The operation of my control system may be described as follows: Assuming the master controller MC to be moved to its position 1, and the master reverser to be thrown to its forward position, a circuit is first established from the trolley through a conductor 3, control fingers 4 and 5—which are bridged by a contact member 6 of the master controller—a conductor 7 and the control resistor CR to the negative conductor "ground". Another circuit is thereupon established from an intermediate point in the control resistor to the conductor 8, the actuating coil of the switch LS, conductors 9 and 10, control fingers 11 and 12—which are bridged by contact member 13 of the main reversing switches RS—conductor 14, control fingers 15 and 16—which are bridged by a contact member 17 of a master reverser—and a conductor 18 to ground. Another circuit is simultaneously established from the conductor 8 through conductors 19, 20 and 21, control fingers 22 and 23—which are bridged by a contact member 24 of the master controller—conductor 25, an interlocking contact member marked "P—out" and the actuating coil of the switch S to the conductors 26 and "ground". A third control circuit is also established from a second intermediate point in the control resistor through conductor 27, coöperating stationary and movable contact members 28 of the overload trip switch OT., the actuating coil of the switch $R^1$, conductor 29 and control finger 30, which engages the energized contact member $30^a$ of the master controller. The switches LS, S and $R^1$ are thus closed, whereby the motors are connected in series-circuit relation, with all of the accelerating resistor AR included in the circuit.

If the master controller is moved to its position 2, the contact member 24 engages a control finger 31 whence circuit is completed through conductor 32, the actuating coil of the switch $R^2$, coöperating stationary and movable contact members 33 of the overload trip switch OT and the conductor 27 to the control resistor CR. The switch $R^2$ is thus closed and the switch $R^1$ is substantially simultaneously opened by reason of the disengagement of the control finger 30 and the contact member $30^a$, whereby a certain section of the accelerating resistor AR is excluded from circuit to accelerate the motors.

If the master controller is moved to position 3, an energized contact member 34 engages a control finger 35, from which point circuit is completed through a conductor 36 and the actuating coil of the switch $R^3$ to the conductor 27. If the controller is moved to position 4, the energized contact members 24 engages a control finger 37, whence circuit is completed through a conductor 38 and the actuating coil of the switch $R^4$ to the conductor 27. Substantially simultaneously, the contact member 34 disengages the control finger 35. In position 5, the actuating coil of the switch $R^1$ is again energized through the engagement of an energized contact member 39 with the control finger 30, and the actuating coil of the switch $R^3$ is likewise energized by the engagement of the contact member 39 with the control finger 35. The coil of the switch $R^4$ is deënergized at the same time by reason of the disengagement of the contact member 24 with the control finger 37. In this way, the various resistor switches are manipulated to gradually accelerate the motors until, in position 5 of the master controller, the motors are connected in full series relation, with all of the accelerating resistors excluded.

During the transition from series to parallel relation of the motors, the contact member 24 engages a control finger 40, from which point circuit is established through conductor 41 and the actuating coil of the switch G to conductor 26. The switch $R^1$ is also opened by reason of the disengagement of the contact member 39 with the control finger 30.

In position 6, the switch S is opened by the disengagement of the contact member 24 and the control finger 23, and the actuating coil of the switch P is thereupon energized from the conductor 41 through an interlocking contact member marked "S-out".

In position 7, the switch $R^3$ is opened through the disengagement of the contact member 39 with the control finger 35, and switch $R^4$ is closed by the reëngagement of the contact member 24 with the control finger 37. In position 8, the switch $R^1$ is closed by reason of the engagement of the contact member 42 of the master controller with the control finger 30; and in position 9, the switch $R^3$ is closed by the energizing of the control finger 35 from the contact member 42, and the switch $R^4$ is opened by reason of the disengagement of the contact member 24 and the control finger 37. Thus, the accelerating resistor, which was again included in the motor circuit, upon the initial parallel connection of the motors, is again gradually excluded from circuit until, in position 9, the motors are disposed in full parallel relation, with all the accelerating resistors short-circuited.

The actuation of the switches, that is caused by the operation of the master controller to the position 9, produces a certain instantaneous increase in the motor current, as will be understood, whereby the limit switch L is actuated to its upper position to break the circuit of the actuating coil of the field change-over switches. However, when the motor current has decreased to a value which is determined by the characteristics of the limit switch L, the movable contact member of the switch drops to its lower position, whereupon a circuit is established from the conductor 20 through interlocking contact members marked, respectively, "P—in," "R³—in," and "R¹—in," the coöperating stationary and movable contact members 43 of the limit switch L and the actuating coil of the field change-over switches to ground. Upon the operation of the field change-over switches, their actuating coil is connected to a holding circuit from the conductor 19, through the interlocking contact member marked "FF," the energization of the coil thus being thereafter independent of the operation of the limit switch L. It will thus be observed that the field change-over switches are not actuated from their "full-field" position to their "normal-field" position until the full accelerating effect of the total exclusion of the resistor AR is obtained, whereby the smoothness and efficiency of the motor acceleration is increased.

It should be noted that my invention embodies simple and inexpensive means for providing "field control" in any suitable type of control system, by the mere addition of suitable devices without the necessity of making any inherent modifications of the control apparatus which would otherwise be employed.

I do not wish to be restricted to the specific circuit connections and arrangement of parts herein set forth, but desire that only such limitations shall be imposed as are indicated in the appended claims.

I claim as my invention:

1. In a control system, the combination with a supply circuit, and a plurality of electric motors severally provided with armatures and field windings, of means for effecting series-parallel acceleration of said motors, and means dependent upon predetermined circuit connections and current conditions for varying the active portions of said field windings.

2. In a control system, the combination with a supply circuit, and a plurality of electric motors severally provided with armatures and field windings, of means for effecting series-parallel acceleration of said motors, and means dependent upon predetermined current conditions for automatically varying the strength of the field winding after the motors are disposed in full parallel relation.

3. In a control system, the combination with a supply circuit, and a plurality of electric motors severally provided with armatures and field windings, of manually-controlled switching means for effecting series-parallel acceleration of said motors, and automatic switching means operative under relatively low motor-current conditions only after the motors are disposed in full parallel relation for excluding portions of said field windings from circuit.

4. In a series-parallel system, the combination with a supply-circuit, and an electric motor provided with an armature and a series-connected subdivided field winding, of a plurality of motor-circuit switches including certain switches that are employed only during parallel relation of the motors, severally provided with closing coils, a switching device for varying the active portions of the field windings and having an actuating coil, a limit switch actuated in accordance with the motor current and having auxiliary contact members included in the energizing circuit of said actuating coil under relatively low motor-current conditions, and interlocking means associated with one of said certain switches for completing the circuit of said actuating coil, whereby the active portions of the field windings are varied only after the motors are disposed in full parallel relation and the motor-current has decreased to a predetermined value.

5. In a control system, the combination with a supply circuit, an electric motor provided with an armature and a series-connected subdivided field winding, and a plurality of accelerating resistors, of a plurality of motor-circuit switches, including resistor short-circuiting switches, severally provided with closing coils, an auxiliary control system for governing said closing coils to start, and gradually exclude said resistors to accelerate said motors, a switch biased to exclude a portion of said field winding from circuit when certain switches, including said short-circuiting switches, are closed, and an actuating coil for said biased switch that is connected to have its current vary with the motor current and adapted to maintain said switch open when the current exceeds a predetermined value, whereby the effective action of the field winding is automatically changed subsequently to the closing of said certain switches, when the motor current decreases to said predetermined value.

In testimony whereof, I have hereunto subscribed my name this 29th day of May 1914.

CLARENCE RENSHAW.

Witnesses:
C. L. Davis,
B. B. Hines.